US011871768B2

(12) United States Patent
White et al.

(10) Patent No.: US 11,871,768 B2
(45) Date of Patent: Jan. 16, 2024

(54) SYSTEM AND METHOD FOR A DRINK STERILIZATION UNIT

(71) Applicants: Kyieme White, Edison, NJ (US); Jenna Elsayed, Edison, NJ (US)

(72) Inventors: Kyieme White, Edison, NJ (US); Jenna Elsayed, Edison, NJ (US)

( * ) Notice: Subject to any disclaimer, the term of this patent is extended or adjusted under 35 U.S.C. 154(b) by 307 days.

(21) Appl. No.: 17/091,667

(22) Filed: Nov. 6, 2020

(65) Prior Publication Data

US 2021/0177012 A1 Jun. 17, 2021

Related U.S. Application Data

(60) Provisional application No. 62/946,755, filed on Dec. 11, 2019.

(51) Int. Cl.
| | | |
|---|---|---|
| *G01N 23/00* | (2006.01) | |
| *A61N 5/00* | (2006.01) | |
| *A23L 2/50* | (2006.01) | |
| *A23L 3/28* | (2006.01) | |
| *A23L 3/00* | (2006.01) | |
| *C12H 1/16* | (2006.01) | |

(52) U.S. Cl.
CPC ............. *A23L 2/50* (2013.01); *A23L 3/001* (2013.01); *A23L 3/003* (2013.01); *A23L 3/28* (2013.01); *C12H 1/165* (2013.01); *A23V 2002/00* (2013.01)

(58) Field of Classification Search
CPC ..... A61L 2/10; A61L 2202/23; A61L 2202/10
USPC ................. 422/24, 186.3; 250/455.11, 492.1
See application file for complete search history.

(56) References Cited

U.S. PATENT DOCUMENTS

| | | | |
|---|---|---|---|
| 6,753,536 B2 * | 6/2004 | Humphreys | A61L 2/04 250/455.11 |
| 8,779,385 B2 * | 7/2014 | Noori | A61L 2/10 250/455.11 |
| 2008/0265179 A1 * | 10/2008 | Havens | A61L 2/10 250/492.1 |
| 2011/0044848 A1 * | 2/2011 | Wright | A61L 2/10 422/186.3 |

* cited by examiner

*Primary Examiner* — Monzer R Chorbaji
(74) *Attorney, Agent, or Firm* — Bold IP, PLLC

(57) ABSTRACT

A unit is disclosed for sterilizing and disinfecting an object, and particularly, a drink or beverage. The unit includes a housing with a set of retractable doors. The unit includes an interior chamber in which an object, including a drink or beverage, can be placed for sterilization and disinfection. The unit includes ultraviolet lights that can be activated when the drink or object is placed within the interior chamber. The ultraviolet lights are configured to emit ultraviolet wavelengths that sterilize and disinfect the surfaces of the drink or object. The unit includes sensors to detect motion in front of the unit and to open and close the set of retractable doors automatically. The unit further includes a drip tray and removable base that houses the electronics of the unit.

13 Claims, 7 Drawing Sheets

SYSTEM AND METHOD FOR A DRINK STERILIZATION UNIT

CROSS-REFERENCE TO RELATED APPLICATIONS

This application is a non-provisional application which claims priority to U.S. Provisional Patent Application No. 62/946,755 filed on Dec. 11, 2019, which is incorporated by reference in its entirety.

FIELD OF THE DISCLOSURE

The present invention relates to a system and method for using a sterilization unit that is configured to disinfect and sterilize objects. In particular, the sterilization unit disclosed herein in one or more non-limiting embodiments may easily sterilize and disinfect a drink in a safe, sterile environment while the owner of the drink or other beverage is indisposed. The drink sterilization unit may be easily mounted or otherwise located in public or private venues in areas where a user would benefit from having a drink sterilization unit.

BACKGROUND

Many individuals like to purchase and carry their drinks or beverages around with them. If an individual is at a party, a sporting event, a concert, at a dance club, or many other locations or venues, it is common to see people holding their drinks and carrying them around with them, including to the bathroom or to a kitchen area so as not to leave the drink or beverage unattended. The disadvantage with this is that the bathroom that the user is located in or any other location is usually unclean. If the individual with the drink has to put the drink on the floor or even on another commonly used surface, the drink may end up contaminated with bacteria, viruses, germs, or various contaminants that may be end up on one or more surfaces of the drink and that are harmful to the health of the user. Accordingly, there is a need for a sterilization unit that may be used in particular for drinks or beverages for a user to sterilize and disinfect his or her drink.

The sterilization unit may also be used with various other objects as well.

SUMMARY

Embodiments are provided below for a drink sterilization unit that includes a housing that has one or more ultraviolet lights and an interior cavity. The drink sterilization unit may further include a drip tray disposed within the housing and beneath the interior cavity, and one or more doors that are configured to open and close. The one or more doors are configured to provide access or block access to the interior cavity. The housing unit may further include a base, whereby the one or more ultraviolet lights are configured to emit ultraviolet wavelengths in order to disinfect and sterilize the drink or other object when located within the interior cavity. The drink sterilization unit may include one or more selectors for manually opening and closing the doors of the drink sterilization unit. The ultraviolet lights disposed within the sterilization unit may activate automatically after a period of time to disinfect and sterilize the drink or other object. Alternatively, the sterilization unit may include one or more weight or pressure sensors in the drip tray that detect when a drink or object has been placed on the drip tray and is responsive to detecting the presence of the drink or other object on the drip tray, activating the ultraviolet lights. In order to save energy and power, the ultraviolet lights may be programmed to deactivate after a particular amount of time.

As an alternative to the drink sterilization unit that may be opened and closed manually by the user, another embodiment is provided for herein whereby the one or more doors of the drink sterilization unit may automatically open and close upon detecting any motion in front of or near the one or more doors. Accordingly, the user may wave their hands in front of or under the drink sterilization unit so that the one or more doors automatically open and the user can simply place the drink or other object inside of the interior cavity and on the drip tray without having to touch the drink sterilization unit, its doors, or another button or selector. Accordingly, the drink sterilization unit may include a microcontroller, a sensor, such as an infrared sensor capable of detecting any motion in front of or near the drink sterilization unit, as well as one or more motors. Accordingly, the use of the sensor and the motors to operate the doors may enable the doors to operate independently of a user's touch.

In one or more non-limiting embodiments, the present description includes a method of using a drink sterilization unit. The method may include activating one or more ultraviolet lights directed at the interior cavity of the drink sterilization unit in order to sterilize and disinfect a drink or other object located within the interior cavity of the drink sterilization unit. After a designated period of time, the one or more ultraviolet lights may be deactivated in order to save energy and power even if the drink or object is still stored within the interior cavity of the drink sterilization unit. The method may further comprise sensing motion in front of or otherwise near the one or more doors of the drink sterilization unit and automatically opening the one or more doors so that the drink or the other object can be placed within the interior cavity of the drink sterilization unit, and then automatically closing the one or more doors after the drink or the other object has been placed within the interior cavity of the drink sterilization unit.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
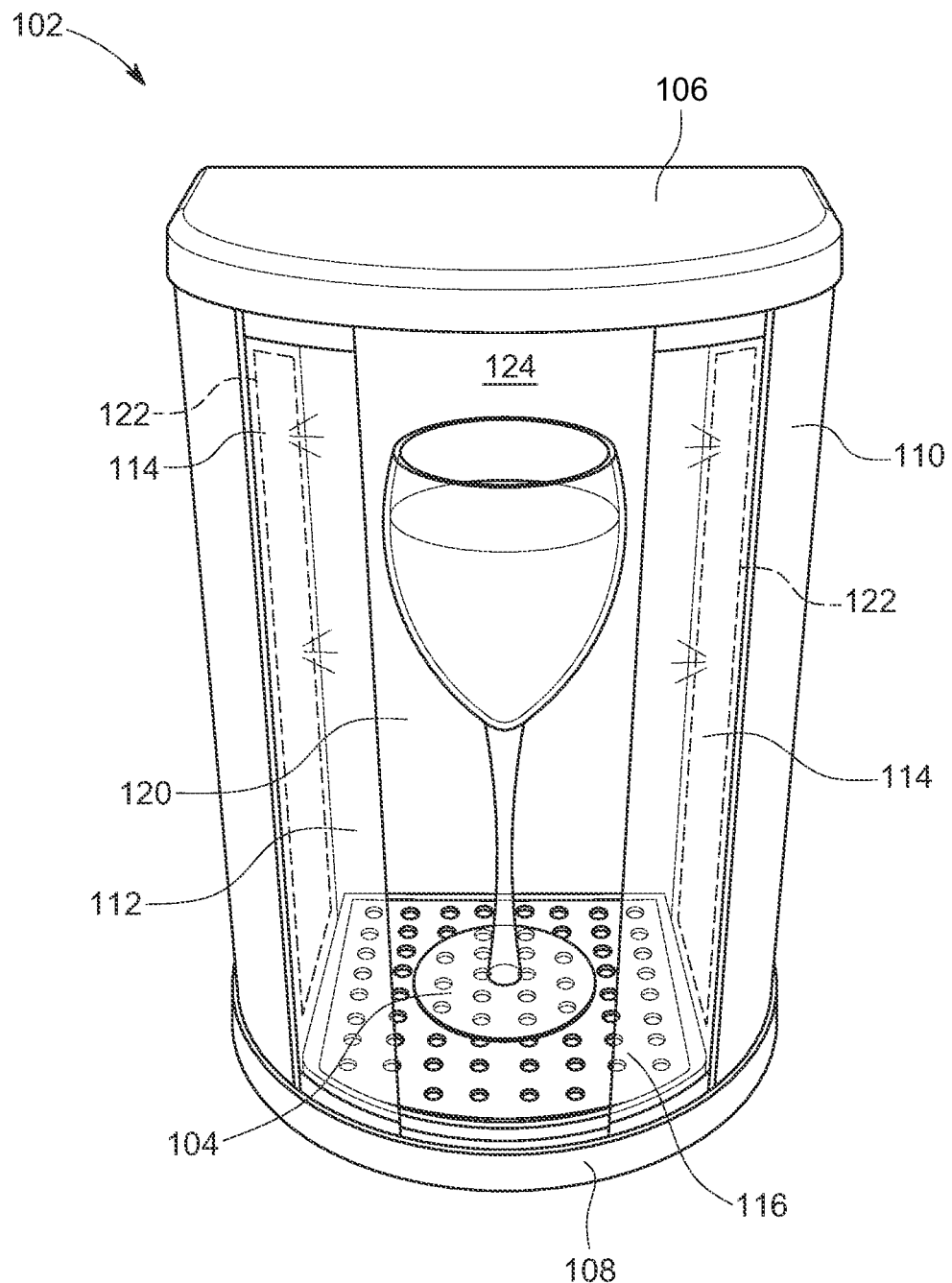
FIG. 1 is a pictorial illustration of a drink sterilization unit in accordance with an illustrative embodiment.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components. The term "set" as used herein may refer to "one or more."

The present disclosure is generally drawn to various embodiments for a drink sterilization unit. The drink sterilization unit may be particularly suitable for disinfecting and sterilizing a drink or beverage placed within the interior chamber of the drink sterilization unit and kept for safekeeping while a user is indisposed and unable to hold the drink or beverage. The drink sterilization unit, as described in one or more non-limiting embodiments, may include ultraviolet lights that emit ultraviolet wavelengths capable of destroying harmful organisms. The ultraviolet radiation from the one or more ultraviolet lights may help to disinfect and sanitize the surfaces of the drink or beverage from unwanted elements, such as microorganisms, including but not limited to viruses, bacteria, and other germs. Other unwanted contaminants may also be effectively destroyed using the drink sterilization unit described below, including pathogens, molds, and other unwanted contaminants that can be found on the surfaces of the user's drink that can harm the health of the user.

The drink sterilization unit, described below in one or more non-limiting embodiments, is not limited to be used only with drinks or beverages, but may also accommodate any type of other object the user may have, including his or her keys, wallet, phone, glasses, makeup, or any other type of object. Advantageously, in one or more non-limiting embodiments, the drink sterilization unit may include a set of retractable doors that open and close over the interior cavity of the drink sterilization unit where a user's drink or other object is located. The set of retractable doors may open and close automatically in the embodiment where the drink sterilization unit includes a set of sensors that detect motion in front of or near the drink sterilization unit, which can cause a set of motors to in turn open or close the set of retractable doors of the drink sterilization unit.

Alternatively, the user may manually open and close the set of retractable doors and place the drink or other object himself or herself within the interior chamber of the drink sterilization unit. Further, the drink sterilization unit may advantageously be mounted on any wall surface or other surface and located in any type of venue that is convenient. Alternatively, the sterilization unit described below in non-limiting embodiments may be freestanding and portable so as to be carried to different locations. Further details about a drink sterilization unit will be provided with respect to the Figures below.

FIG. 1 shows a non-limiting embodiment of a drink sterilization unit 102. The drink sterilization unit 102 can disinfect and sterilize a user's drink 104 that may be located and placed within an interior cavity or chamber 112 of the drink sterilization unit 102. The term "drink sterilization unit" may be interchangeably be referred to herein as "sterilization unit." Further, the term "drink" as used herein may refer to any type of beverage or beverage container. In the example shown in FIG. 1, the drink 104 is a wine glass containing wine or any other liquid. It is noted that drink sterilization unit 102 may be used with any other type of drink container or drink including bottles, cups, holders, or thermoses regardless of what material they are made from. Further, the drink containers may have lids or be open containers, as shown in FIG. 1. As shown in FIG. 1, the drink 104 may be placed within the interior cavity or chamber 112 of the sterilization unit 102 in an upright position so as to prevent the liquid contents of the drink 104 from toppling over or spilling.

Figure 2:
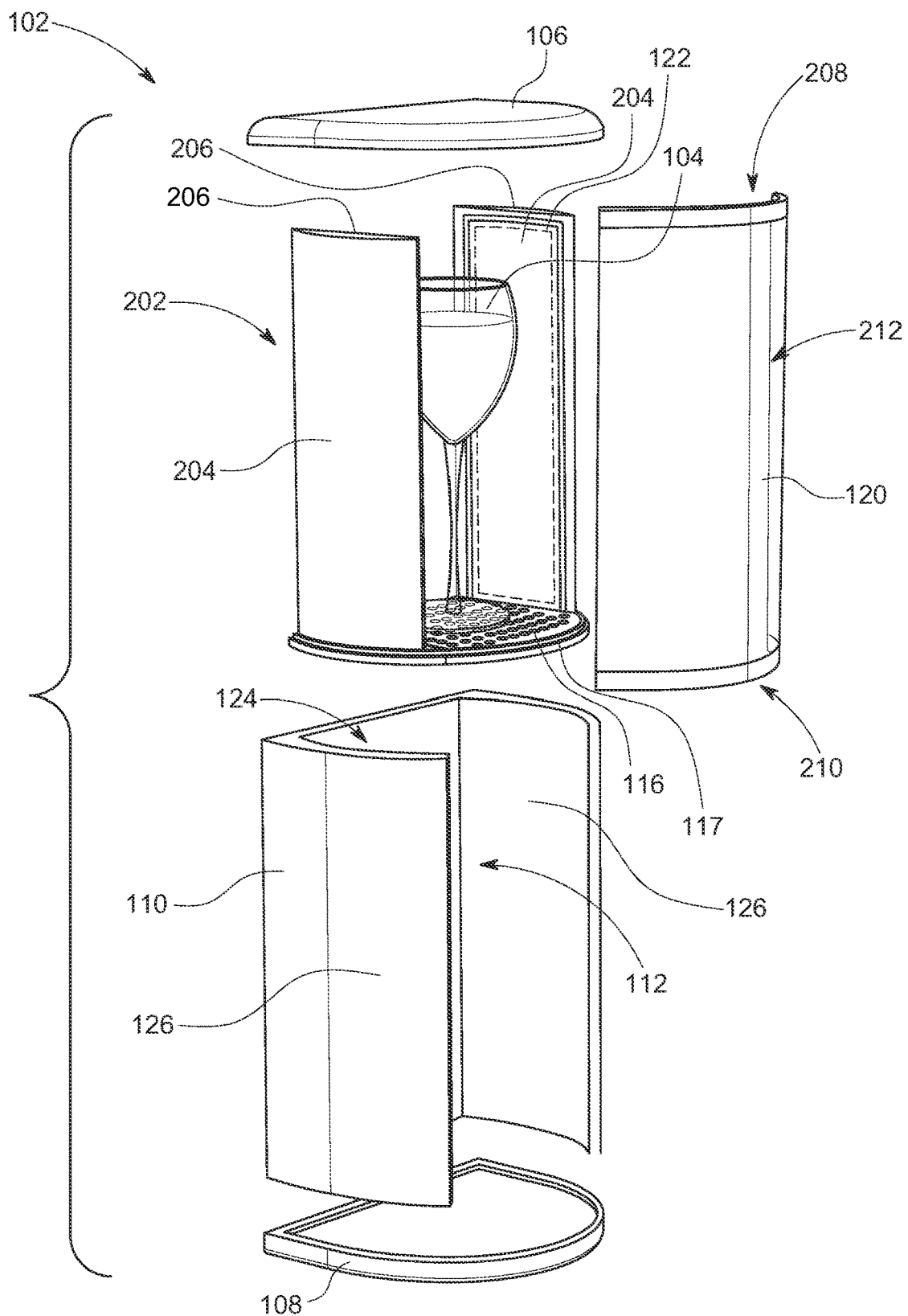
FIG. 2 is a pictorial illustration of an exploded view of the drink sterilization unit in accordance with an illustrative embodiment.
Figure 3:
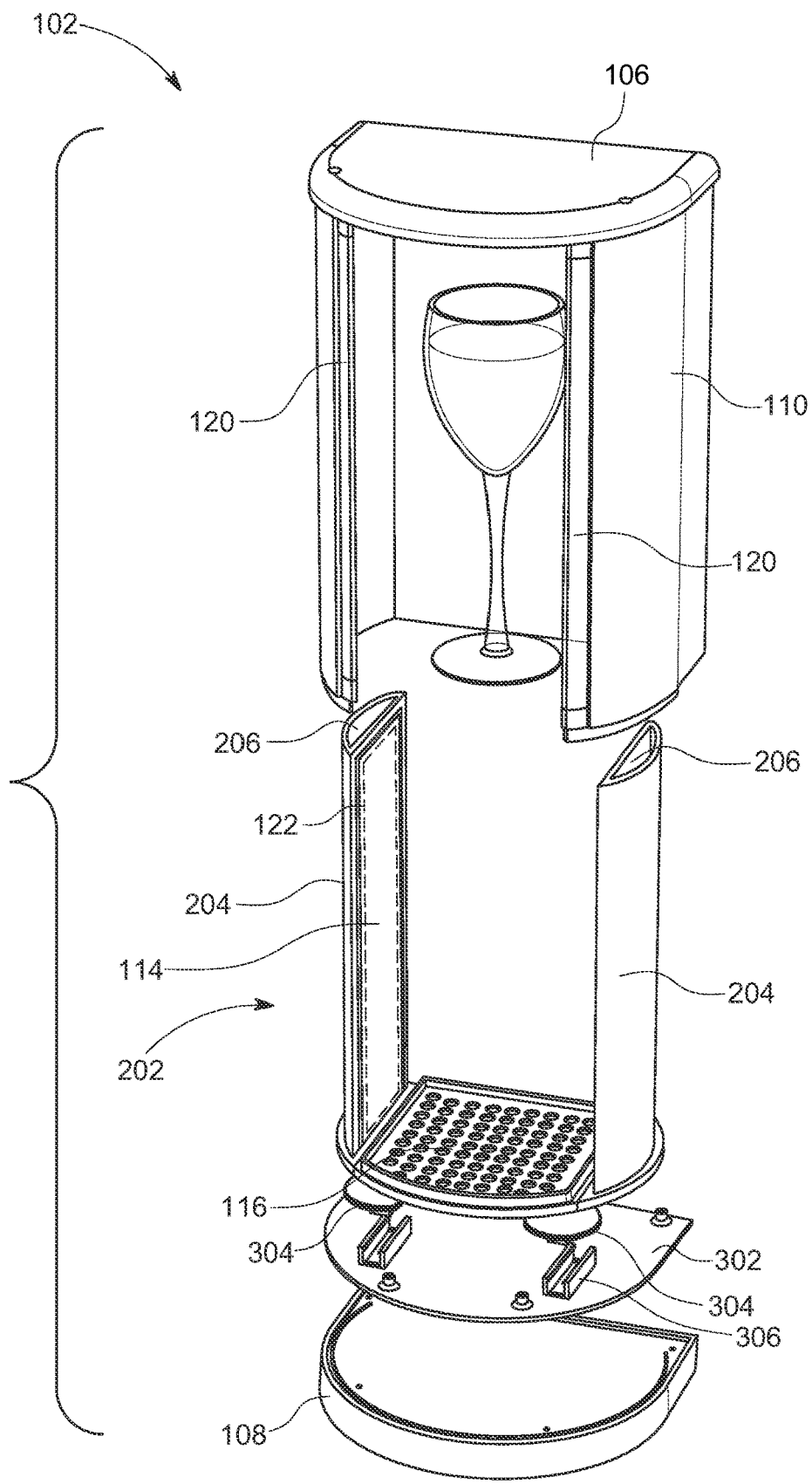
FIG. 3 is a pictorial illustration of another exploded view of the drink sterilization unit in accordance with an illustrative embodiment.

FIG. 2 is an exploded view of a non-limiting embodiment of the drink sterilization unit 102 shown in FIG. 1. FIG. 3 is another exploded view of the drink sterilization unit 102. In one or more non-limiting embodiments, as shown in FIGS. 1-3, the sterilization unit 102 includes a top plate or top surface 106 and a base 108. The base 108 may include one or more plates, such as plate 302, as well as other components, including electromechanical components such as those shown in FIGS. 3-5 and as discussed further later on. The base 108 may be removable in one or more embodiments, as is the top plate 106.

The top surface 106 and the base 108 may be coupled to or integrally formed with an outer housing 110 of the sterilization unit 102. The outer housing 110 of the sterilization unit 102 may fit around or otherwise be coupled to an inner housing assembly, shown as inner housing assembly 202 in FIG. 2. In one or more non-limiting embodiments, the front surface of the top plate 106 and the base 108 may have a curved, arcuate shape as shown in FIGS. 1-2. Alternatively, in other embodiments, the top plate 106 and base 108 may take on other shapes and configurations.

The sterilization unit 102 may include a drip tray, such as drip tray 116 shown in FIG. 1 and FIG. 2. The drip tray 116 may be a support surface on which the drink 104 or another physical object belonging to the user can be placed. In some embodiments, the drip tray 116 may be removable so that the drip tray 116 can be washed and cleaned regularly. The drip tray 116 may be removable also for easy access to an underlying support plate 117 as shown in FIG. 2. The underlying support plate 117 connected to an underside of the drip tray 116 may also function as a protective plate that prevents any liquids in the drink 104 from spilling and harming any electronics stored within an interior area of the base 108 of the sterilization unit 102. As shown in FIG. 1 and FIG. 2, the drip tray 116 and/or support plate 117 may be located above the base 108 of the sterilization unit 102. The drip tray 116 and/or support plate 117, as shown in FIG. 2, may be part of the inner housing assembly 202 in one or more non-limiting embodiments.

As shown in FIG. 1 and FIG. 2, the sterilization unit 102 may include a set of retractable doors, such as retractable doors 120. The set of retractable doors 120 can be a single panel door or may have multiple pieces and components in one or more non-limiting embodiments. In the illustrations of FIG. 1 and FIG. 2, the set of retractable doors 120 include at least two main panels that can open to provide access to an interior chamber 112 of the sterilization unit 102 and can then fully close to block access and cover the interior chamber 112 of the sterilization unit 102. FIG. 1 shows the set of retractable doors 120 in an open position and thus providing access to the interior chamber 112 of the sterilization unit 102. FIG. 2 shows the set of retractable doors 120 in a closed position blocking access to the interior chamber 112 of the sterilization unit 102. The two panels of the set of retractable doors 120 may meet and make contact at a central meeting point 208 as shown in FIG. 2 when in the fully closed position. The set of retractable doors 120 may be clear and transparent in a preferred embodiment so that the drink 104 or other object is visible to the user through the set of retractable doors 120. Alternatively, the set of retractable doors 120 may be instead opaque and not transparent in various other embodiments.

In one or more non-limiting embodiments, the top edge 208 of the set of retractable doors 120 may contact one or more surfaces of the top plate 106. In one or more non-limiting embodiments, the bottom edge 210 of the set of retractable doors 120 may extend past the drip tray 116 and contact one or more surfaces of the base 108 (and/or support plate 117). Further, the top edge 208 of the set of retractable doors 120 may fit behind the top edge of the top plate and the bottom edge 210 of the set of retractable doors 120 may fit behind the bottom edge of the base 108. The set of retractable doors 120 may be curved in one or more non-limiting embodiments as shown in FIG. 1 and FIG. 2. Alternatively, the set of retractable doors 120 may be straight.

As shown in FIG. 2, in a non-limiting embodiment, the outer housing assembly 110 may include two side panels 126 and a back surface 124 that define the interior cavity 112 of the drink sterilization unit 102. Each outer housing side panel 126 may be coupled to the top plate 106 and the base 108 of the sterilization unit 102.

The inner housing assembly 202 is configured to fit within the outer housing assembly 110 as shown in the exploded view of FIG. 2. The inner housing assembly 202 may include two side panels 204. Each inner housing side panel 204 may also be coupled to the top plate 106 and the base 108. Further, each inner housing side panel 204 may be coupled to the drip tray 116 and/or support plate 117.

In one or more non-limiting embodiments, the inner housing side panels 204 may extend vertically upwards and perpendicular to the drip tray 116. The inner housing side panels 204 may be placed facing each other and define the interior cavity 112 of the sterilization unit 102. In one or more non-limiting embodiment, each inner housing side panel 204 includes a clear surface 114 as shown in FIG. 1 and FIG. 3. The clear surface 114 may be made of glass or plastic or any type of clear material. The clear surface 114 may face the interior cavity 112 of the sterilization unit 102 and the opposite inner housing side panel 204 as shown in FIG. 1 and FIG. 3 when located in the inner housing assembly 202.

Further, the inner housing side panels 204 may include cavities 206 that extend downwardly within each inner housing side panel 204. The cavities 206 within each inner housing side panel 204 may be defined by the back wall of the inner housing side panel 204 and the clear surface 114. As shown in FIG. 1-FIG. 2, in one or more non-limiting embodiments, the ultraviolet lights 122 are stored and fitted within the inner cavities 206 of the inner housing side panels 202. Accordingly, any ultraviolet light emitted or radiated from the ultraviolet lights 122 shines through the clear surface 114 of the inner housing side panel 204 and onto a drink 104 or other object that is located within the interior cavity 112 of the sterilization unit 102. The drink 104 or other object will thus be within the light path of the ultraviolet lights 122.

While in the embodiments shown in FIGS. 1-4, the ultraviolet lights 122 are oriented so as to shine on the drink 104 or other object from the side panels 204, in alternative embodiments, the ultraviolet lights 122 may be housed in other locations other than or in addition to the side panels 204 of the inner housing assembly 202. For example, ultraviolet lights 122 may be located within the top surface 106 and shine down on the drink 104 or another object. Alternatively, ultraviolet lights 122 may be located within the base 108 and shine upwardly on the drink 104 or another object. Further still, there may be ultraviolet lights 122 stored within the inner housing side panels 204 as well as in any of these other locations in other non-limiting embodiments.

The ultraviolet lights 122 are depicted in broken lines to indicate that the ultraviolet lights 122 are located behind the clear surface 114 and within the cavities 206 of the inner housing assembly 202 as shown in FIGS. 1-3. FIG. 1 further includes a depiction of a "glowing light" shown as the three lines coming out of the clear surface 114 in order to illustrate that the ultraviolet lights 122 have been turned on and are activated to shine through the clear surface 114 of the inner housing assembly 202.

The ultraviolet (UV) lights 122 emit ultraviolet wavelengths and ultraviolet radiation. Ultraviolet lights 122 can disinfect and sterilize the surfaces of a drink 104 or another object from unwanted elements such as bacteria, viruses, germs, or other unwanted elements. Ultraviolet radiation is classified into three primary types: ultraviolet A (UVA), ultraviolet B (UVB), and ultraviolet C (UVC). These groups are based on the measure of their wavelength, which is measured in nanometers. Ultraviolet wavelengths are invisible to the human eye but can be detected using other devices.

As noted above, the sterilization unit 102 provides UV sterilization via the one or more ultraviolet lights 122. For UV sterilization, it may be preferable for the ultraviolet lights 122 to emit UVC radiation, which has a wavelength in the range of approximately 100 to 280 nanometers. UVC has a high enough energy to effectively kill microorganisms and other harmful elements. Studies have shown that UVC is effective against a variety of organisms, and also effective in killing foodborne pathogens, natural microbiota, molds, and yeasts. Because microorganisms come with different sizes and shapes that affect their UV absorption, the required time for killing each species may vary. UV sterilization is also known as UV disinfection or ultraviolet germicidal irradiation (UVGI), which works by breaking down certain chemical bonds and scrambling the structure of DNA, RNA, and proteins, causing a microorganism to be unable to multiply. When a microorganism is unable to multiply, it is considered dead since it cannot reproduce within a host and is no longer infectious. The destruction of these organisms and unwanted elements occurs because UV sterilization uses the energy of UVC wavelengths to destroy biomolecules. The overall effectiveness of the UV sterilization of the sterilization unit 102 may take into consideration the total amount of energy applied which is affected by the length of exposure time and the distance from the light source.

In one or more non-limiting embodiments, the drink 104 or another object is located in proximity to the side panels 204 of the inner housing assembly 202 and therefore proximate to the ultraviolet lights 122 that are emitting ultraviolet wavelengths (e.g. UVC wavelengths). The drink 104 or another object, in use, will therefore be in the light path of the ultraviolet wavelengths emitted by the ultraviolet lights 122. Further, the ultraviolet lights 122 may be programmed to be activated for a period of time in order to provide enough exposure time to disinfect and sterilize the drink 104 or another object. While different microorganism may require different exposure times than others to be destroyed by the UVC wavelengths of the ultraviolet lights 122, the ultraviolet light 122 may be programmed to automatically radiate the UVC wavelengths for a minimum period of time that may be useful for destroying most microorganisms. For example purposes only and without limitation on range of time, the ultraviolet light 122 may be programmed to be activated for a range of 5 to 10 minutes at a minimum. A greater or lesser amount of time may alternatively be used during which the ultraviolet lights 122 are activated. In some non-limiting embodiments, the sterilization unit 102 may include the ability to allow the user to select the length of exposure time that the drink 104 or another object is exposed to the UVC wavelengths of the ultraviolet lights 122.

Accordingly, the sterilization unit 102 provides a number of advantages. For one, no chemicals are needed to disinfect one's drink 104 or another object such that no chemical residue is left behind on the user's drink 104 or other object needing sterilization. Further, the ultraviolet lights 122 within the sterilization unit 102 are capable of destroying multiple kinds of microorganisms, including chemical resistant bacteria or viruses.

Because direct exposure to UVC light may be dangerous to humans, the sterilization unit 102 includes various surfaces that protect and shield the user or human from the direct exposure to UVC light from the ultraviolet lights 122. For example, the sterilization unit 102 incorporates the outer housing 110 and the inner housing assembly 202. Further, the ultraviolet lights 122 are fitted and hidden behind a clear surface 114. Further the set of retractable doors 120 may be closed when the drink 104 or other object is being sterilized via the ultraviolet lights 122. Accordingly, for safety reasons, the sterilization unit 102 does not leave the ultraviolet lights 122 openly exposed, but rather includes various barriers to protect surrounding users. Further, in one or more non-limiting embodiments, if the set of retractable doors 120 are opened, the ultraviolet lights 122 may automatically shut off so as to protect the user from any harmful exposure.

Any type of light source may be used for ultraviolet light 122 included light emitting diodes (LEDs) or other types of light bulbs. In one or more non-limiting embodiments, the ultraviolet lights 122 may be included as multiple light emitting diodes (LEDs). As known in the art, there are UV-LED lights in the form of light strips that emit UVC wavelengths. Accordingly, such UV-LED lights having UVC may be used in drink sterilization unit 102. Alternatively, other UVC emitting light devices may be used and fitted within the side panels 204 or on another location of the sterilization unit 102. The ultraviolet lights 122 may obtain their power from the microcontroller 508, which is further described below, whereby the microcontroller 508 is further connected to a power source and can control the operation of the ultraviolet lights 122. If no microcontroller 508 is included, the ultraviolet lights 122 may be powered on and off and connected to a power source including integrated batteries.

In one or more non-limiting embodiments, the set of retractable doors 120 may be manually opened and closed by a user. The sterilization unit 102 may include one or more selectors to open and close the set of retractable doors 120. Such selectors are commonly known in the art by one of ordinary skill and may include any type of button, lever, toggle, slide device, or any other type of selector as known in the art.

Alternatively, the set of retractable doors 120 may be automatically programmed to open upon detecting motion. For example, a user may wave his or her hands in front of the sterilization unit 102 and the set of retractable doors 120 may automatically open for a programmable period of time that is sufficient for the user to either place the drink 104 or another object inside of the interior cavity 112 of the sterilization unit 102. The user may also wave his or her hands in front of the sterilization unit 102 in order to remove his or her drink 104 or other object that has already been sterilized by having been kept inside of the interior chamber 112 of the sterilization unit 102 for a period of time. This type of motion, i.e. the wave hand, is one example only of a motion that the sterilization unit 102 may detect. Further, in other embodiments, the user may cause the set of retractable doors 120 to open or close by placing his or her hands and waving or not waving them under the base 108 of the sterilization unit 102 rather than in front of the sterilization unit 102, such as with the automatic dryers often found in bathrooms and washrooms. In other embodiments, any motion other than wave hand that the user engages in that is proximate to the sterilization unit 102 may cause the set of retractable doors 120 to open and close.

Accordingly, in one or more non-limiting embodiments, the set of retractable doors 120 may retract backwards to provide access to the interior cavity 112 of the sterilization unit 102 and to open the doors. Further, the set of retractable doors 120 may extend forward and block access to the interior chamber 112 of the sterilization unit 102 to close the doors. In one or more non-limiting embodiments, the doors 120 may retract backwards and fit in a gap, whereby the gap is located between the interior of the outer housing 110 and the exterior of the inner housing assembly 202. The outer housing 110 may be wider than the inner housing assembly 202 so as to contain and encompass the inner housing assembly 202 with a gap remaining between the interior of the outer housing 110 and the inner housing assembly 202.

Figure 4:
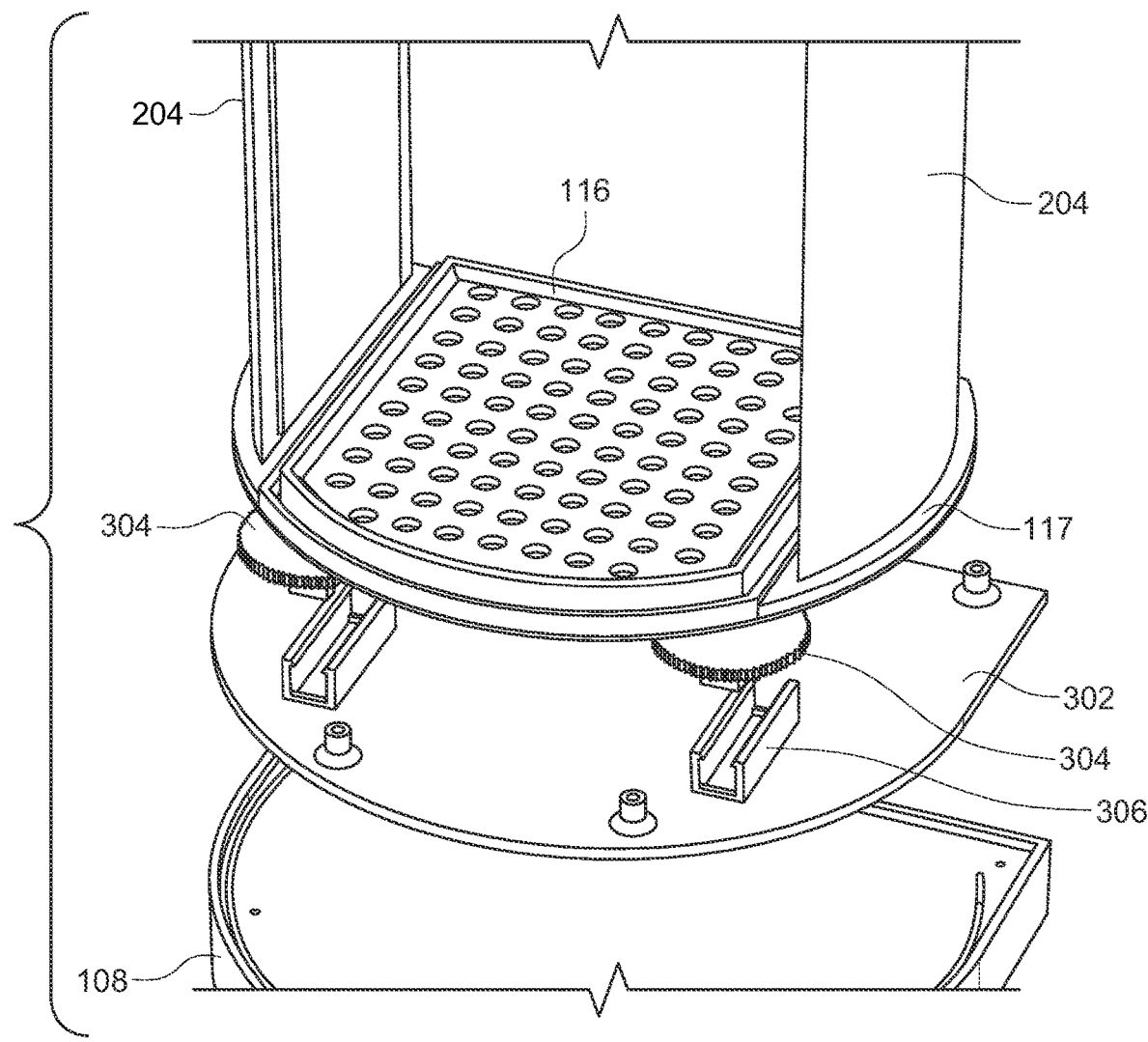
FIG. 4 is a pictorial illustration of another exploded view of the drink sterilization unit showing a closer view of the drip tray and base of the drink sterilization unit in accordance with an illustrative embodiment.
Figure 5:
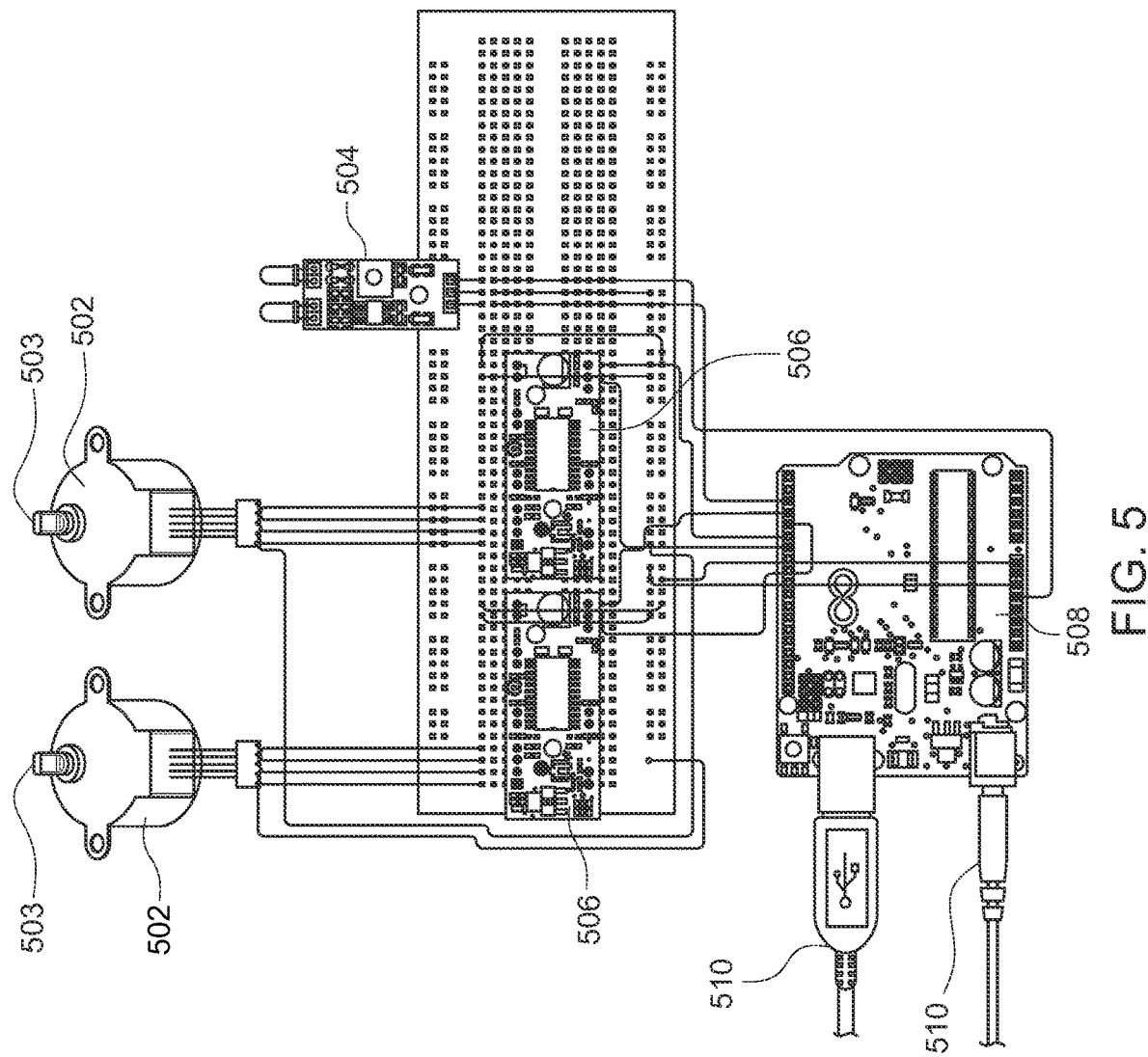
FIG. 5 is a pictorial illustration of a schematic for a microcontroller and other connected components in accordance with an illustrative embodiment.

In order for the set of retractable doors 120 to open and close, a number of electromechanical components may be used. As noted above, FIG. 3 and FIG. 4 show additional exploded views of a lower portion of the sterilization unit 102 and include further details for the base 108, including an interior plate 302 that has one or more gears 304. FIG. 5 is a schematic of some of the electrical components that may be included with the sterilization unit 102. In one or more non-limiting embodiment, the microcontroller 508 may be an Arduino UNO® unit, which is a well-known microcontroller which can be programmed by a computer to control one or more functions and cause one or more outputs to occur. Accordingly, FIG. 5 shows the microcontroller 508 having USB cables 510 coupled to the microcontroller 508 to indicate that the microcontroller 508 may be connected to a computer via the USB cables 510 and programmed to provide one or functions as further described below.

While not shown, in one or more non-limiting embodiments, a printed circuit board (PCB) module may be used to modulate and control the power provided from a power source to the microcontroller. Accordingly, the sterilization unit 102 may be coupled to a power source. The power source may provide power to the one or more electromechanical components of the sterilization unit 102. The power source may be an electrical outlet that provides electrical energy to the sterilization unit 102 or may be obtained from any type of battery that may be included within the sterilization unit 102 and housed in a battery compartment of the sterilization unit 102.

In one or more non-limiting embodiments, the set of retractable doors 120 are motor operated. Accordingly, the motors 502 shown in FIG. 5 may be coupled to one or more gears 304. The gears 304 may be coupled to the motors 502 via shafts that extend through the central hole of the gears 304 and connect to the tips 503 of the motors 502, thus causing the gears 304 to turn in either a clockwise or counterclockwise direction. The motors 502 shown in FIG. 5 may be DC motors in one or more non-limiting embodiments. A DC motor is a rotary electrical motor that converts direct current electrical energy into mechanical energy. Accordingly, via the connected shaft that connects to the tip 503 of the DC motor 502, the gears 304 can be rotated in either a clockwise or counterclockwise direction to cause the connected set of retractable doors 120 to open and close.

The motors 502 incorporated into the sterilization unit 102 may be coupled to the microcontroller 508 and also to one or more motor drivers 506. Each motor 502 may be coupled to its own respective motor driver 506 that is programmed to operate its motor 502 to turn in a particular direction, i.e. clockwise or counterclockwise, and for a programmed amount of time. Motor drivers 506 act as an interface between the motors 502 and the microcontroller 508.

While not shown in the Figures, the set of retractable doors 120 may include a gear rack that runs along the interior bottom edge 210 of the set of retractable doors 120. A gear rack, as understood by one of ordinary skill in the art, may have a set of teeth that are configured to mesh with the teeth of the gears 304. Accordingly, the gears 304 may be configured to slidably engage and mesh with the gear rack of the set of retractable doors 120 in order to open and close the set of retractable doors 120. The location of the gears 304 on the support plate 302 shown in FIG. 3 and FIG. 4 is purely exemplary as the gears 304 may have different locations other than as shown in FIG. 3 and FIG. 4. Further, the gear rack may also be located elsewhere other than the interior bottom edge 210 of the set of retractable doors 120 as long as the gear rack can slidably mesh with the gears 304.

In addition to the above, in one or more non-limiting embodiments, the sterilization unit 102 may include one or more sensors that have various functions. In one or more non-limiting embodiments, an infrared sensor, such as infrared sensor 504, may be connected to the microcontroller 508. Infrared sensor 504 may be a passive sensor because it may measure only infrared radiation, rather than emit the infrared radiation. The passive infrared sensor 504 may detect and measure infrared radiation that may be emitted by a human user. Every human radiates infrared energy at a specific wavelength range that can be sensed by the infrared sensor 504. Once the infrared sensor 504 detects the requisite infrared radiation, the infrared sensor 504 is also effectively detecting motion of the user. Accordingly, the infrared sensor 504 may sense motion based on changes in the background heat signature. Infrared sensor 504 may detect whether a person has moved into or out of its field of vision and, thus, within the needed range of proximity to the sterilization unit 102.

Accordingly, the infrared sensor 504 may detect changes in the amount of infrared radiation in its field of vision, which means everything in front of the infrared sensor 504. When a person passes in front of the infrared sensor 504 that is integrated into the sterilization unit 102, the amount of radiation increases because the human's body temperature is higher than the background temperature. The infrared sensor 504 can detect this fluctuation, which is converted into a voltage change inside the sterilization unit 102 and provided as an input to the microcontroller 508 to provide a response. In one or more non-limiting examples, the microcontroller 508 may control the DC motors 502 via the motor drivers 506 and provide a determination whether to turn the motors 502 in a clockwise or counterclockwise direction so as to cause the one or more retractable doors 120 to open or close by the intermediate set of gears 304. The infrared sensor 504 may have a detection range within which the infrared sensor 504 is able to detect infrared radiation and indicate that motion is occurring in front of or near the sterilization unit 102. It is noted that the infrared sensor 504 may be placed in the base 108 or in another location of the sterilization unit 102.

Other sensors may also be included in the sterilization unit 102. While not shown, in some embodiments, weight and/or pressure sensors may be coupled to the microcontroller 508 and may function to detect when a drink 104 or other object has been placed on the drip tray 116 of the sterilization unit 102. Accordingly, the set of retractable doors 120 in such an embodiment may be programmed to open and close based on the input provided by the weight or pressure sensors (not shown) in addition to or in place of the one or more infrared sensors 504.

The infrared sensor 504 may be useful to avoid having a user touch any physical buttons or other physical selectors to open the one or more set of retractable doors 120 and avoid having more bacteria or viruses contact the user's skin, drink 104, or other objects. The touchless system of the sterilization unit 102 may allow the user to wave his or her hands and the set of retractable doors 102 may automatically open and/or close due to the detection of the user (i.e. the user's infrared radiation) by the one or more infrared sensors 504. Accordingly, the user can minimize or avoid altogether touching the physical surfaces of the sterilization unit 102 to help ensure greater cleanliness and sanitation.

As noted above, in one or more non-limiting embodiments, the sterilization unit 102 may have the outer housing 110 and the inner housing assembly 202. The base 108 may include multiple compartments. The drip tray 116 and the support plate 117 may be coupled to the inner housing assembly 202 and the electromechanical components of the sterilization unit 102 may be stored or housed in the base 108 area. For example, the gears 304 may be coupled to either the support plate 302 or to another surface or location within the base 108. Preferably, the gears 304 are configured to contact the gear rack of the set of retractable doors 120 so as to slidably mesh with the gear rack of the set of retractable doors 120 to cause the doors 120 to open and close.

The microcontroller 508 and attached components, such as one or more sensors (e.g. infrared sensor 504), the motors 502, and motor drivers 506 may be contained within an interior chamber or compartment of the base 108. These electromechanical components of the sterilization unit 102 may be protected from any liquids from the drink 104 by the dividing drip tray 116 and/or support plate 117. In one or more non-limiting embodiments, as shown in FIG. 4, the support plate 302 of the base 108 may clip onto the support plate 117 that is connected to the drip tray 116 via one or more clips 306. The clips 306 shown in FIG. 3 and FIG. 4 are exemplary only and any other type of fastener or means of attachment may be used to connect the support plate 302 of the base 108 to the support plate 117 and/or the drip tray 116, including, soldering or welding.

The sterilization unit 102 may be mounted onto one or more wall structures of any type of venue. It may be advantageous to mount the sterilization unit 102 in a bathroom or kitchen so that the users may easily place their drinks 104 or other objects inside of the interior chamber 112 of the sterilization unit 102 in areas that are particularly high traffic and have a lot of potential unwanted contaminants, including bacteria and viruses. In this sense, the sterilization unit 102 may act to sterilize as well as to store and house the drink 104 or other object for safe keeping. As noted above, many people often carry their drinks 104 into the bathrooms of public venues and areas, which causes a health concern that the drinks 104 become contaminated with harmful elements. It may be particularly advantageous for a sterilization unit 102 such as sterilization unit 102 to be mounted in one or more bathroom stalls so that if a user enters the bathroom stall, he or she can simply place the drink 104 into the sterilization unit 102 and not worry where he or she can place the drink 104 in the bathroom. Further, this will ensure that the drink 104 does not spill over and is kept safe within the sterilization unit 102.

As noted above, instead or in addition to the user's drink 104, the user may want to include his or her keys, phone, wallet, or other objects that may benefit from UV sterilization or radiation. It is foreseeable that the sterilization unit 102 may be particularly beneficial in areas having a large amount of people where beverages and drinks are regularly consumed and distributed, such as restaurants, clubs, bars, schools, stadiums. However, this is a non-limiting list of venues, as sterilization unit 102 may be useful in any type of location, including in any type of residential or commercial location. As noted above, in some cases, the sterilization unit 102 may be connected to a power source such as an outlet to provide electric energy for the electromechanical components. Alternatively, or additionally, the sterilization unit 102 may include a compartment for batteries and may be battery operated.

In some embodiments, the sterilization unit 102 is not mounted to a wall or other support structure. Rather, the sterilization unit 102 may be freestanding. Further, the sterilization unit 102 may be portable so as to be easily carried and transported to various locations by the user any time the user has need of a sterilization unit 102.

In some embodiments, the sterilization unit 102 may be free to any user. In other cases, the sterilization unit 102 may be opened only if a user has paid in advance or if is part of a membership. In some embodiments, the user may have an application on his or her phone or other computing device and communicate with the sterilization unit 102 via Bluetooth or Wifi. In other embodiments, the sterilization unit 102 may be unlocked via a QR code on the user's phone or other computing device.

The sterilization unit 102 may be particularly longer in its height than in its width in one or more non-limited embodiments. This may enable the sterilization unit 102 to accommodate many sized drinks and beverages that have a taller height profile. In one or more non-limiting embodiments, the height of the sterilization unit 102 so as to accommodate drinks may range anywhere from 4-10 or more inches in height.

Figure 6:
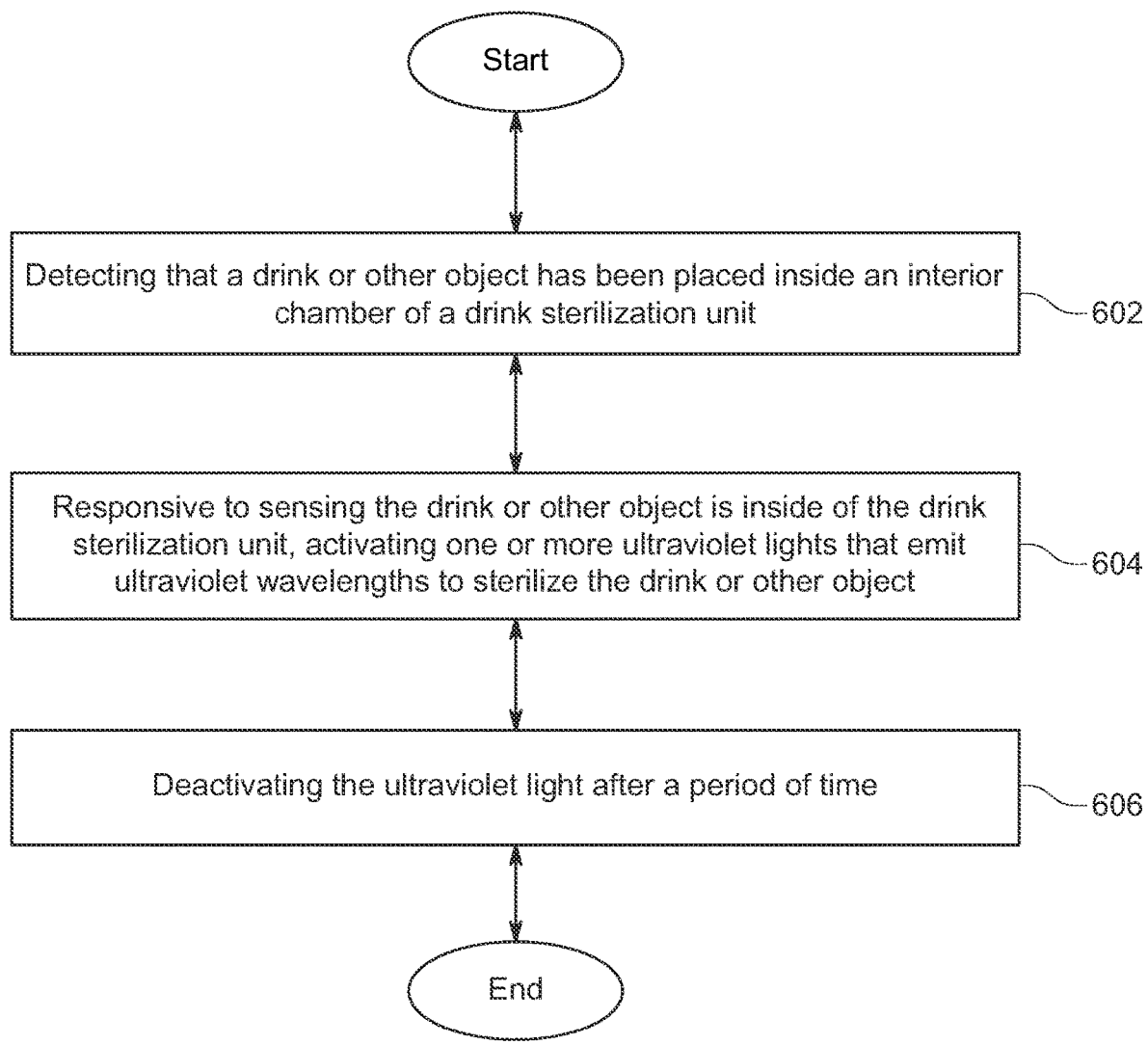
FIG. 6 is a flowchart of an exemplary method of using the drink sterilization unit in accordance with an illustrative embodiment.

Referring to FIG. 6, FIG. 6 is a flowchart of an exemplary method of using a sterilization unit, such as sterilization unit 102. In one or more non-limiting embodiments, at step 602, the method may begin with the sterilization unit 102 detecting that a drink or other object has been placed inside of an interior chamber 112 of the drink sterilization unit 102. In some embodiments, the drink sterilization unit 102 may include one or more sensors, such as a weight sensor and/or a pressure sensor, to sense when a drink 104 or other object has been placed on the drip tray 116 and to then notify the microcontroller 508 and/or ultraviolet lights 122 when the drink 104 or other object has been placed on the drip tray 116. At step 604, the method may continue with responding to sensing the drink 104 or other object inside of the sterilization unit 102 by activating one or more ultraviolet lights 122 to emit UV radiation or wavelength in order to sterilize the drink 104 or other object.

In other embodiments, the step 602 may be omitted because the sterilization unit 102 may not include the sensors to detect that a drink 104 or other object has been placed on the drip tray 116. At step 606, the ultraviolet lights 122 may be deactivated after a period of time. The exposure time of the ultraviolet lights 122 may be programmed to a minimum period of time that may be effective in killing many known microorganisms as explained above.

Figure 7:
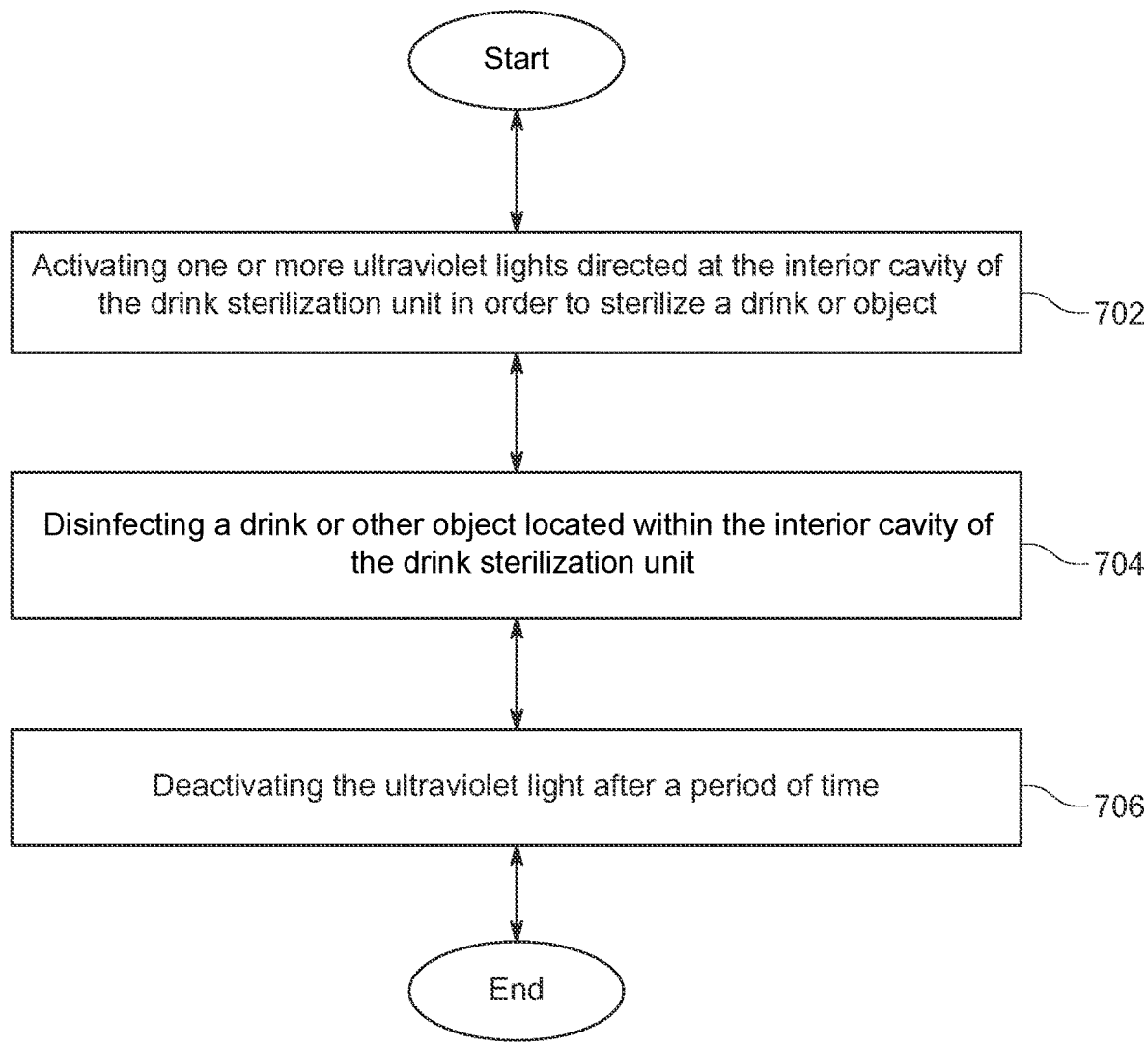
FIG. 7 is a flowchart of another exemplary method of using the drink sterilization unit in accordance with an illustrative embodiment.

FIG. 7 is a flowchart for another exemplary method of using drink sterilization unit 102. At step 702, the method may begin with activating the one or more ultraviolet lights 122 to sterilize a drink 104 or another object. The ultraviolet lights 122 emit UV wavelengths that are directed towards the interior chamber 112 of the drink sterilization unit 102 whereby the drink 104 or other object is within the light path of the ultraviolet lights 122. The step 702 of FIG. 7 may include activating the one or more ultraviolet lights 122 responsive to the set of retractable doors 120 opening and then closing rather than detecting when a drink 106 or object has been placed on a drip tray 116.

At step 704, the drink 104 or another object is disinfected. At step 706, the ultraviolet lights 122 are deactivated after a period of time. As noted above, it may be beneficial to program the microcontroller 508 such that the one or more ultraviolet lights 122 are programmed to deactivate or to turn off when the set of retractable doors 120 are opened.

In embodiments where the sterilization unit 102 may be controlled manually, the user may physically open or close the set of retractable doors 120. In some cases, the set of retractable doors 120 may thus include a handle or other element for manually pulling the set of retractable doors 120 open and pushing the doors 120 shut. The sterilization unit 102 may further include a power button to power the ultraviolet lights 122 on or off as desired by the user. Accordingly, once a user has placed the drink 104 or other object inside of the sterilization unit 102, the user determines when to press the power button on or off in order to activate the ultraviolet light 122 for a recommend/desired/or programmed period of time.

There are thus various configurations that may be provided in which the sterilization unit 102 is fully programmable and includes various automated features and functions, such as automatic control of the set of retractable doors 120. Alternatively, or additionally, the sterilization unit 102 may be manually operated and controlled by the user. It may be beneficial to combine some manual switches and buttons to control the opening and closing of the set of retractable doors 120 for maintenance and troubleshooting purposes even if the sterilization unit 102 is automated.

As shown in FIGS. 1-7, many uses, and advantages are offered by the one or more non-limiting embodiments in the present description of sterilization unit 102.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A drink sterilization unit, the drink sterilization unit comprising:
a housing comprising one or more ultraviolet lights and an interior cavity, the housing further comprising:
an outer housing;
an inner housing, wherein the inner housing is contained within the outer housing, the inner housing comprising:
a pair of side panels, wherein the one or more ultraviolet lights are stored and fitted within an interior cavity of each side panel of the pair of side panels;
a drip tray disposed within the housing and beneath the interior cavity,
wherein the pair of side panels in the inner housing extend vertically upwards and perpendicular to the drip tray,
wherein the one or more ultraviolet lights contained with the interior cavity of each side panel are aimed to shine inwardly from the inner housing;
one or more doors configured to open and close, wherein the one or more doors are configured to provide access or block access to the interior cavity; and
a base,
wherein the one or more ultraviolet lights are configured to emit ultraviolet wavelengths in order to disinfect and sterilize a drink or other object when located within the interior cavity.

2. The drink sterilization unit of claim 1, further comprising, one or more selectors for powering on and off the one or more ultraviolet lights, wherein the one or more ultraviolet lights are coupled to a power source.

3. The drink sterilization unit of claim 1, wherein the one or more ultraviolet lights comprise UV-LED lights.

4. The drink sterilization unit of claim 1, wherein the one or more ultraviolet lights are located behind a glass or plastic surface of each side panel.

5. The drink sterilization unit of claim 1, wherein the one or more doors are configured to be opened manually.

6. The drink sterilization unit of claim 1, further comprising, a sensor to detect when the drink or other object is located on the drip tray.

7. The drink sterilization unit of claim 1, wherein the drip tray is connected to a protective plate to prevent any liquids from penetrating one or more electrical components disposed beneath the protective plate.

8. The drink sterilization unit of claim 1, further comprising:
a microcontroller;
one or more motors and one or more motor drivers; and
one or more sensors, wherein the set of doors are configured to open and close automatically, the one or more sensors comprising an infrared sensor.

9. The drink sterilization unit of claim 8, wherein the set of doors are automatically retractable.

10. The drink sterilization unit of claim 8, wherein the one or more sensors and the one or more motors are connected to the microcontroller, and wherein the one or more sensors and the one or more motors are stored in the base of the drink sterilization unit.

11. The drink sterilization unit of claim 8, wherein the infrared sensor acts as a motion detector and causes the set of doors to open and close in response to a motion detected near the drink sterilization unit.

12. The drink sterilization unit of claim 8, wherein the one or more doors are coupled to the one or more motors that are configured to open and close the one or more doors.

13. The drink sterilization unit of claim 8, wherein the one or more motors are coupled to one or more gears, wherein the one or more gears are coupled to a gear rack of the one or more doors.

* * * * *